United States Patent [19]

Birch et al.

[11] Patent Number: 5,080,914

[45] Date of Patent: Jan. 14, 1992

[54] SNACK PRODUCT AND PROCESS OF MAKING

[75] Inventors: Mark R. Birch, Bedford; Mervyn R. Goddard, Rushden, both of Great Britain

[73] Assignee: Conopco, Inc., N.J.

[21] Appl. No.: 452,573

[22] Filed: Dec. 18, 1989

[30] Foreign Application Priority Data

Dec. 21, 1988 [GB] United Kingdom ............... 8829834

[51] Int. Cl.$^5$ .................... A21D 15/06; A21D 15/08
[52] U.S. Cl. ........................ 426/93; 426/94; 426/559; 426/808
[58] Field of Search ............... 426/94, 93, 275, 289, 426/292, 295, 302, 559, 808

[56] References Cited

U.S. PATENT DOCUMENTS

| | | | |
|---|---|---|---|
| 3,499,766 | 3/1970 | Vollink et al. | 426/559 |
| 3,703,379 | 11/1972 | Cummisford et al. | 426/559 |
| 4,409,250 | 10/1983 | VanHulle et al. | 426/94 |

Primary Examiner—Marianne Cintins
Assistant Examiner—Helen Pratt
Attorney, Agent, or Firm—Brumbaugh, Graves, Donohue & Raymond

[57] ABSTRACT

A snack product and process of making which pops and expands upon heating with microwaves consists of a solid, partially cooked, poppable and expandable core (moisture content of 12–16 wt. %) comprising pregelatinized and/or native tapioca starch, which core is provided with an adherent, poppable, non-expandable coating of cooked dough, which preferably comprises black gram or urid flour.

15 Claims, No Drawings

SNACK PRODUCT AND PROCESS OF MAKING

The present invention relates to a snack product which pops and expands upon heating with microwaves, as well as to a process of preparing such a snack food, and to a process of preparing a popped and expanded snack food product.

It is known to prepare popcorn in a microwave oven. If the package of the popcorn is well designed and the oven is high powered, then the percentage of popcorn popped will be acceptably high. Popcorn, however, is almost the only product which at the same time pops and expands.

With the increasing penetration of consumer microwave ovens into the household, puffed snack products could be prepared at the consumer's convenience by microwave puffing of commercially prepared puffable farinaceous dough pellets, optionally provided with a cheese coating. However, not all pellets puff successfully and those pellets which do not puff sufficiently can dry, harden and even char under microwave heating. Moreover, these products only expand but do not exhibit both popping and expansion.

Therefore there is still a need to extend the range of products that both pop and expand. It is an object of the present invention to provide an extension of the range of snack products that are both poppable and expandable under heating in a microwave oven. By microwave ovens are understood throughout this specification and the claims both domestic and industrial microwave ovens.

It has been found that a snack product which pops and expands upon heating with microwaves can be obtained by providing a solid, partially cooked, poppable and expandable core with a specified moisture content and comprising a certain type of starch with an adherent poppable, non-expandable coating of a cooked dough.

Therefore, the present invention relates to a snack food product which pops and expands upon heating with microwaves, which comprises a solid, partially cooked, poppable and expandable core comprising pregelatinized and/or native tapioca starch, having a moisture content of from 12 to 16 percent by weight, which core is provided with an adherent poppable, non-expandable coating of cooked dough.

Preferably the cooked dough of the coating comprises black gram or urid (*Phaseolus mungo L.; Vigna mungo L.*) flour.

The solid, partially cooked, poppable and expandable core consists of pellets which are prepared from a dough, which comprises native tapioca starch, pregelatinized tapioca starch, or mixtures thereof. In addition to the tapioca starch, the core may also comprise a starch selected from the group consisting of: potato starch, pregelatinized potato starch, corn starch, pregelatinized corn starch, waxy maize starch, rice starch, pregelatinized rice starch, and mixtures of these starches.

In addition to the starch material, the core may also comprise at least one of the substances selected from the group consisting of: common salt (or salt substitutes), herbs, spices, flavouring agents (especially savoury flavouring agents), colouring agents, vegetables, fruits, animal proteins (like dried meat or fish), vegetable proteins (like soy flour, soy isolate, soy protein concentrate, gluten or mixtures thereof), fungal proteins (like mycoprotein), sugars (like sucrose), fats (including oils of vegetable, animal or synthetic origin or fat substitutes, such as sucrose polyesters of fatty acids), emulsifiers (like food grade fatty acid monoglycerides, lecithin and the like), stabilizers, dairy products (like cheese, non-fat dry milk, whole milk solids and/or buttermilk solids), honey, chocolate, confectionary, minerals, vitamins, preservatives, fibres, and mixtures thereof. These substances may be used in levels up to 10 percent by weight of the core or pellet.

The core has a moisture content of from 12 to 16 percent by weight, and preferably the moisture content is from 14 to 15 percent by weight.

The adherent, poppable, non-expandable coating of cooked dough preferably comprises black gram or urid (*Phaseolus mungo L.; Vigna mungo L.*) flour, but in addition to this flour also other types of flour, such as wheat flour, wholemeal wheat flour, soybean flour and the like may be used. The organoleptic properties of the adherent, poppable, non-expandable coating of cooked dough are dependent of the type of flour or the mixture of flours used and the additives incorporated, since the cooked dough may also comprise at least one of the substances selected from the group consisting of: common salt (or salt substitutes), herbs, spices, flavouring agents (especially savoury flavouring agents), colouring agents, vegetables, fruits, animal proteins (like dried meat or fish), vegetable proteins (like soy flour, soy isolate, soy protein concentrate, gluten or mixtures thereof), fungal proteins (like mycoprotein), sugars (like sucrose), fats (including oils of vegetable, animal or synthetic origin or fat substitutes, such as sucrose polyesters of fatty acids), emulsifiers (like food grade fatty acid monoglycerides, lecithin and the like), stabilizers, dairy products (like cheese, non-fat dry milk, whole milk solids and/or buttermilk solids), honey, chocolate, confectionary, minerals, vitamins, preservatives, fibres, and mixtures thereof. These substances may be used in levels up to 10 percent by weight of the coating.

It has also been found, that the behaviour of the coating upon microwaving is dependent on the type of flour used for the coating. Some of the coatings not only pop upon microwaving, but also crack (either audibly or silently). Generally it can be said that the use of bean flours entails more cracking and by the use of cereal flours the popping effect can be enhanced. Thus good results have also been obtained by using for the adherent poppable, non-expandable coating of cooked dough a mixture of 50 wt % of wheat flour and 50 wt % of chick pea flour, or a mixture of 75 wt % of wheat flour and 25 wt % of soybean flour, hence using no black gram or urid flour. The coating may therefore consist of mixtures of one or more bean flours and one or more cereal flours.

The core and the adherent coating may have the same or different taste, colour or composition. The microwave-poppable and -expandable snack food product may be in the shape of more or less spherical pellets, but it may have any desired geometrical form, such as rings, letters or digits, phantasy figures (like animals, etc.). Moreover, the adherent coating may on its outer surface at least partially be provided with flavouring agents or other coatings imparting flavour, colour or surface effects to the final product.

The poppable and expandable snack product may be prepared by a variety of processes, such as co-extrusion using a cooker-extruder, pan granulation, and other suitable techniques. Also fluidized bed techniques can be used in which the coating is sprayed on the core in thin layers after which the coated product is dried (e.g. for 25 minutes at 85° C.) and this process is repeated until the required coating thickness is obtained.

In a preferred process of preparing the poppable and expandable snack food product, first the solid, partially cooked, poppable and expandable core or pellet is prepared by forming a dough, which is shaped into the required pieces partially cooked and partially dried. This may be done in a continuous mixer-extruder. The partial drying of the cores can be accomplished in any suitable equipment using drying techniques which are known per se. Simple hot air convection drying of the cores is preferred.

The partially dried cores or pellets are then enrobed with a poppable, non-expandable coating of raw dough, and the thus coated cores or pellets are cooked in such a way that the adherent coating is cooked, but the core or pellet is partially cooked. In order to also produce the required crispness in the coating of cooked dough, the cooking may be effected by frying the coating on the pellets, e.g. by heating for 15 to 20 minutes at 120° C.-150° C.

The poppable and expandable snack food product is generally marketed in a suitable packaging or dispenser, in which it can be popped and expanded by placing in in the microwave oven.

In the process of preparing the popped and expanded snack food product, the snack food product according to the present invention is subjected to heating with microwaves.

The invention will now be illustrated by the following examples which in no way are to be construed as limiting the scope of the present invention.

EXAMPLE I

A solid, partially cooked, poppable and expandable core or pellet was formed from:

|  | wt. % |
| --- | --- |
| Native tapioca starch | 83.10 |
| Potato granules | 13.47 |
| Palm oil | 0.73 |
| Glycerol monopalmitate (Admul GMP) | 0.59 |
| Sodium chloride | 2.11 |
|  | 100.00 |

To ensure even dispersion of the fat in the dough, the oil was heated to 60° C. and mixed with the sodium chloride and 44.8% of the potato granules in a domestic food mixer. This premixture was then mixed with all the remaining ingredients for 10 minutes in a Hobart mixer (Trade Mark). Water was then added in such an amount as to adjust the moisture level to 25 percent by weight. This tempering process, which partially swells the starch, assists in the pellet or core dough production in the extruder.

The cores or pellets were produced in a twin screw extruder (Clextral BC 45, ex Clextral S.A., Firminy, France) which operated at 62° C. Water of 20° C. was injected into the extruder to give a weight ratio of water:dry mixture = 1:5. The resulting dough was extruded through a 5 mm orifice at a rate of 20 kg/h. Pellets were cut to the desired size at the die, using a rotating face cutter. The pellets were finally hot air dried to a moisture content of 14 percent by weight.

Subsequently, a non-expandable coating of a raw dough was formed from:

|  | wt. % |
| --- | --- |
| Black gram flour | 67 |
| Water | 33 |

The dough mixture was prepared in a domestic food processor by the addition of the water to the flour with constant agitation.

The cores or pellets were then enrobed with this raw dough as follows:

Dough was sheeted to a thickness of 1 mm and cut into squares 30 mm×30 mm. These squares of raw dough were then wrapped by hand around the pellets, ensuring that all air was expelled from between the pellets and the coating and that the edges of the dough were completely sealed.

The coated pellets were then cooked by frying in vegetable oil at 120° C. to 150° C. for 15-20 minutes.

The snack product thus produced could be popped and puffed to a pleasant eating texture by heating in a 500 W domestic microwave oven for about 30 seconds.

EXAMPLE II

In the same way as described in Example I, a solid, partially cooked expandable core or pellet was formed from:

|  | wt. % |
| --- | --- |
| Native tapioca starch | 72.00 |
| Potato granules | 10.00 |
| Palm oil | 0.73 |
| Sodium chloride | 2.10 |
| Cheese flavouring material | 15.17 |

Subsequently a non-expandable coating of a raw dough was formed from:

|  | wt. % |
| --- | --- |
| Black gram flour | 65 |
| Water | 33 |
| Mixed dried herbs | 2 |

The mixed dried herbs were mixed with the flour and subsequently the dough was prepared as described in Example I.

Finally, the coated cores or pellets were prepared in the same way as described in Example I. Upon popping and puffing the coated cores or pellets as described in Example I, a very tasty savoury snack was obtained.

We claim:

1. A snack product which pops and expands upon heating with microwaves, comprising a solid, partially cooked, poppable and expandable core or pellet comprising pregelatinized and/or native tapioca starch, having a moisture content of from 12 to 16 percent by weight, said core or pellet being provided with an adherent, poppable, non-expandable coating of a cooked dough, the coating of cooked dough comprising black gram flour (*Phaseolus mungo L.*) or urid flour (*Vigna mungo L.*).

2. A snack food product according to claim 1, in which the core or pellet also comprises a starch selected from the group consisting of potato starch, pregelatinized potato starch, corn starch, pregelatinized corn starch, waxy maize starch, rice starch, pregelatinized rice starch, and mixtures thereof.

3. A snack food product according to claim 1, in which the core or pellet also comprises at least one of the additional substances selected from the group consisting of common salt, herbs, spices, flavoring agents, coloring agents, vegetables, fruits, animal proteins, vegetable proteins, fungal proteins, dairy products, sugars, honey, chocolate, confectionery, fats, emulsifiers, stabilizers, minerals, vitamins, preservatives, fibers, and mixtures thereof.

4. A snack product according to claim 1, in which the coating of cooked dough further comprises one or more cereal flours.

5. A snack food product according to claim 1, in which the coating of cooked dough also comprises at least one of the additional substances selected from the group consisting of common salt, herbs, spices, flavoring agents, coloring agents, vegetables, fruits, animal proteins, vegetable proteins, fungal proteins, dairy products, sugars, fats, emulsifiers, stabilizers, minerals, vitamins, preservatives, fibers, and mixtures thereof.

6. A snack food product according to claim 3 or 5 in which up to 10 percent by weight of the additional substances is used.

7. A snack food product according to claim 1, which is in the shape of a ball, a ring, a letter, a digit, or a fantasy figure.

8. A snack food product according to claim 1, in which the adherent, poppable, non-expandable coating of a cooked dough on the outer surface is provided with a coating imparting flavor, color or surface effect to the popped and expanded snack food product.

9. A process of preparing a snack product which pops and expands upon heating with microwaves, comprising the steps of
  (1) preparing a solid, partially cooked, poppable and expandable core or pellet by forming a dough comprising pregelatinized and/or native tapioca starch and having a moisture content of from 12 to 16% by weight; and
  (2) providing the partially cooked, solid core or pellet with an adherent coating of poppable, non-expandable cooked dough comprising black gram flour (*Phaseolus mungo L.*) or urid flour (*Vigna mungo L.*).

10. A process according to claim 9, in which the dough of the core or pellet also comprises a starch selected from the group consisting of potato starch, pregelatinized potato starch, corn starch, pregelatinized corn starch, waxy maize starch, rice starch, pregelatinized rice starch, and mixtures thereof.

11. A process according to claim 9, in which the dough of the core or pellet also comprises at least one of the additional substances selected from the group consisting of common salt, herbs, spices, flavoring agents, coloring agents, vegetables, fruits, animal proteins, vegetable proteins, fungal proteins, dairy products, sugars, honey, chocolate, confectionery, fats, emulsifiers, stabilizers, minerals, vitamins, preservatives, fibers, and mixtures thereof.

12. A process according to claim 9, in which the coating of cooked dough further comprises one or more cereal flours.

13. A process according to claim 9, in which the coating of cooked dough also comprises up to 10% by weight of at least one of the substances selected from the group consisting of common salt, herbs, spices, flavoring agents, coloring agents, vegetables, fruits, animal proteins, vegetable proteins, fungal proteins, dairy products, sugars, fats, emulsifiers, stabilizers, minerals, vitamins, preservatives, fibers, and mixtures thereof.

14. The process of claim 9, wherein the partially cooked, solid core or pellet is provided at least partially with a coating imparting a flavor, color or surface effect.

15. A process for preparing a snack food product which comprises
  1) providing a product having a solid, partially cooked, poppable and expandable core or pellet comprising pregelatinized and/or native tapioca starch, having a moisture content of from 12 to 16% by weight, said core or pellet being provided with an adherent, poppable, non-expandable coating of a cooked dough, the coating of cooked dough comprising black gram flour (*Phaseolus mungo L.*) or urid flour (*Vigna mungo L.*), and
  2) subjecting said product to microwaves to cause said product to be popped and expanded.

* * * * *